US009933778B2

(12) United States Patent
Hamann et al.

(10) Patent No.: US 9,933,778 B2
(45) Date of Patent: Apr. 3, 2018

(54) REMOTE DIAGNOSTICS OF WATER DISTRIBUTION SYSTEMS

(71) Applicant: International Business Machines Corporation, Armonk, NY (US)

(72) Inventors: Hendrik F. Hamann, Yorktown Heights, NY (US); Nigel C. P. Hinds, Great Barrington, MA (US); Levente Klein, Tuckahoe, NY (US); Fernando J. Marianno, New York, NY (US); Ronald F. Ridgeway, Jr., Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 14/541,205

(22) Filed: Nov. 14, 2014

(65) Prior Publication Data

US 2016/0139607 A1 May 19, 2016

(51) Int. Cl.
  *G05D 11/00* (2006.01)
  *G05B 23/02* (2006.01)
  *C02F 1/00* (2006.01)

(52) U.S. Cl.
  CPC .......... *G05B 23/0275* (2013.01); *C02F 1/006* (2013.01); *C02F 1/008* (2013.01); *C02F 2209/001* (2013.01); *C02F 2209/003* (2013.01); *C02F 2209/006* (2013.01); *C02F 2209/008* (2013.01); *C02F 2209/03* (2013.01); *C02F 2209/40* (2013.01)

(58) Field of Classification Search
  IPC .......... A01G 25/16,25/167, 7/00; G06Q 10/06; G08C 17/02; G05D 16/2053; F16K 37/0041; G01F 1/44; C02F 2209/03, 2209/40; G05B 23/0275
  See application file for complete search history.

(56) References Cited

U.S. PATENT DOCUMENTS

| | | | |
|---|---|---|---|
| 3,767,124 A | 10/1973 | Spencer | |
| 4,209,131 A * | 6/1980 | Barash | A01G 25/16 137/624.2 |
| 5,054,690 A | 10/1991 | Olson | |
| 5,228,469 A | 7/1993 | Otten et al. | |
| 5,246,164 A | 9/1993 | McCann et al. | |
| 5,337,957 A * | 8/1994 | Olson | A01G 25/167 137/78.3 |

(Continued)

OTHER PUBLICATIONS

Coates et al., "Precision Irrigation in Orchards: Development of a Spatially Variable Microsprinkler System," Information and Technology for Sustainable Fruit and Vegetable Production, FRUTIC '05, Sep. 12-16, 2005, Montpellier, France, pp. 611-624.

(Continued)

*Primary Examiner* — Tuan Vu
(74) *Attorney, Agent, or Firm* — Robert D. Bean (57) ABSTRACT

Embodiments of the present invention provide systems, methods, and computer program products for performing diagnostics on water distribution systems (e.g., automated drip-line irrigation systems). Embodiments of the present invention can afford users with the ability to identify defective components based on the diagnostics. Furthermore, embodiments of the present invention provide users with additional information in regard to potential causes and trends.

15 Claims, 8 Drawing Sheets

(56) References Cited

U.S. PATENT DOCUMENTS

| | | | |
|---|---|---|---|
| 5,711,482 | A | 1/1998 | Yu |
| 5,829,678 | A | 11/1998 | Hunter et al. |
| 6,085,986 | A | 7/2000 | Yu |
| 6,240,336 | B1 | 5/2001 | Brundisini |
| 6,464,152 | B1 | 10/2002 | Bolinis et al. |
| 6,540,158 | B1 | 4/2003 | Vered |
| 6,694,195 | B1 | 2/2004 | Garcia |
| 7,108,205 | B1 | 9/2006 | Hashimshony et al. |
| 7,899,580 | B2 | 3/2011 | Cardinal et al. |
| 7,930,069 | B2 | 4/2011 | Savelle, Jr. et al. |
| 8,443,822 | B2 | 5/2013 | Ivans |
| 2002/0002425 | A1* | 1/2002 | Dossey ............ G01F 1/44 700/284 |
| 2002/0117214 | A1* | 8/2002 | Tucker ............ G05D 16/2053 137/487.5 |
| 2004/0222325 | A1 | 11/2004 | Regev |
| 2005/0121536 | A1* | 6/2005 | Bavel ............ A01G 7/00 239/69 |
| 2008/0234870 | A1* | 9/2008 | Chalemin ............ A01G 25/167 700/284 |
| 2010/0010682 | A1* | 1/2010 | Cardinal ............ A01G 25/167 700/284 |
| 2011/0137827 | A1* | 6/2011 | Mason, Sr. ............ G06Q 10/06 705/413 |
| 2013/0060389 | A1* | 3/2013 | Marsters ............ A01G 25/16 700/284 |
| 2013/0328697 | A1* | 12/2013 | Lundy ............ G08C 17/02 340/870.16 |
| 2014/0252112 | A1 | 9/2014 | Hamann et al. |
| 2015/0167861 | A1* | 6/2015 | Ferrer Herrera .... F16K 37/0041 239/73 |

OTHER PUBLICATIONS

Coates et al., "Control of individual microsprinklers and fault detection strategies," Precision Agriculture, vol. 7, No. 2, 2006, published online: Apr. 7, 2006, pp. 85-99, © Springer Science+Business Media, LLC 2006, DOI 10.1007/s11119-006-9001-1.

Coates et al., "Design of a System for Individual Microsprinkler Control," Transactions of the ASABE, vol. 49, No. 6, 2006, pp. 1963-1970.

Coates et al., "Wireless Network for Individual Emitter Control in Irrigation," VDI BERICHTE, vol. 1958, 2006, pp. 209-214.

Hamann et al., "Irrigation System," U.S. Appl. No. 13/792,751, filed Mar. 11, 2013.

* cited by examiner

REMOTE DIAGNOSTICS OF WATER DISTRIBUTION SYSTEMS

FIELD OF THE INVENTION

The present invention relates generally to the field of water distribution systems, and more particularly to performing remote diagnostics on automated water distribution systems.

BACKGROUND OF THE INVENTION

Automated water distribution systems capable of automated monitoring, differential distribution, and performing remote diagnostics enables an administrative user of a piping network to deliver water throughout the system with greater control, and easily identify defective components. The distribution system may operate in large spatial areas with thousands of valves arranged in complex networks (e.g., building piping infrastructures, hothouses, garden centers, agricultural lands, etc.).

One such implementation are variable rate water distribution systems which enable differential watering of crops for agricultural lands. For example, rarely are soil properties and crops (e.g., soil water holding capacity, types of crops, etc.) uniform throughout an entire target water distribution area. Variable rate water distribution systems address the dynamic water demands of different soils and crops by delivering a variable amount of water to different portions of the target water distribution area. For example, a drip irrigation system may contain multiple water carrying conduits that are positioned such that the conduits can irrigate many rows of crops. Each of carrying conduits can contain tens to hundreds of solenoid valves, such that a solenoid valve is actuated to initiate irrigation.

In water distribution systems, unintentional loss of water control often results in undesirable, expensive, and dangerous outcomes. Furthermore, in variable rate water distribution systems, the control of water to the different portions of the target water distribution area must be controlled to ensure that the different needs of soil and crops are being met. Accordingly, constant and routine monitoring is typically required to ensure that water is being delivered to designated areas at the appropriate quantity and time, however, such monitoring can be cost ineffective and/or difficult to implement.

SUMMARY

Embodiments of the present invention provide systems, methods, and program products for performing diagnostics on water distribution systems. In one embodiment, a method is provided comprising: transmitting, by one or more computer processors, a water distribution schedule to a plurality of control nodes of a water distribution system; determining, by one or more computer processors, whether the water distribution system is operating in accordance with the water distribution schedule; and responsive to determining that the water distribution system is not operating in accordance with the water distribution schedule, identifying, by one or more computer processors, defective components in the water distribution system.

DETAILED DESCRIPTION

Embodiments of the present invention provide systems, methods, and computer program products for remotely performing diagnostics on a water distribution system. Embodiments of the present invention enable operators to effectively identify the areas in the water distribution system, as well as provide operators with additional information in regard to potential causes and trends. Furthermore, embodiments of the present invention can help detect and identify the location of defective components of the water distribution system. Embodiments of the present invention can be deployed in, and are described in the context of variable rate irrigation building piping infrastructures, hothouses, garden centers, and agricultural lands.

Figure 1:
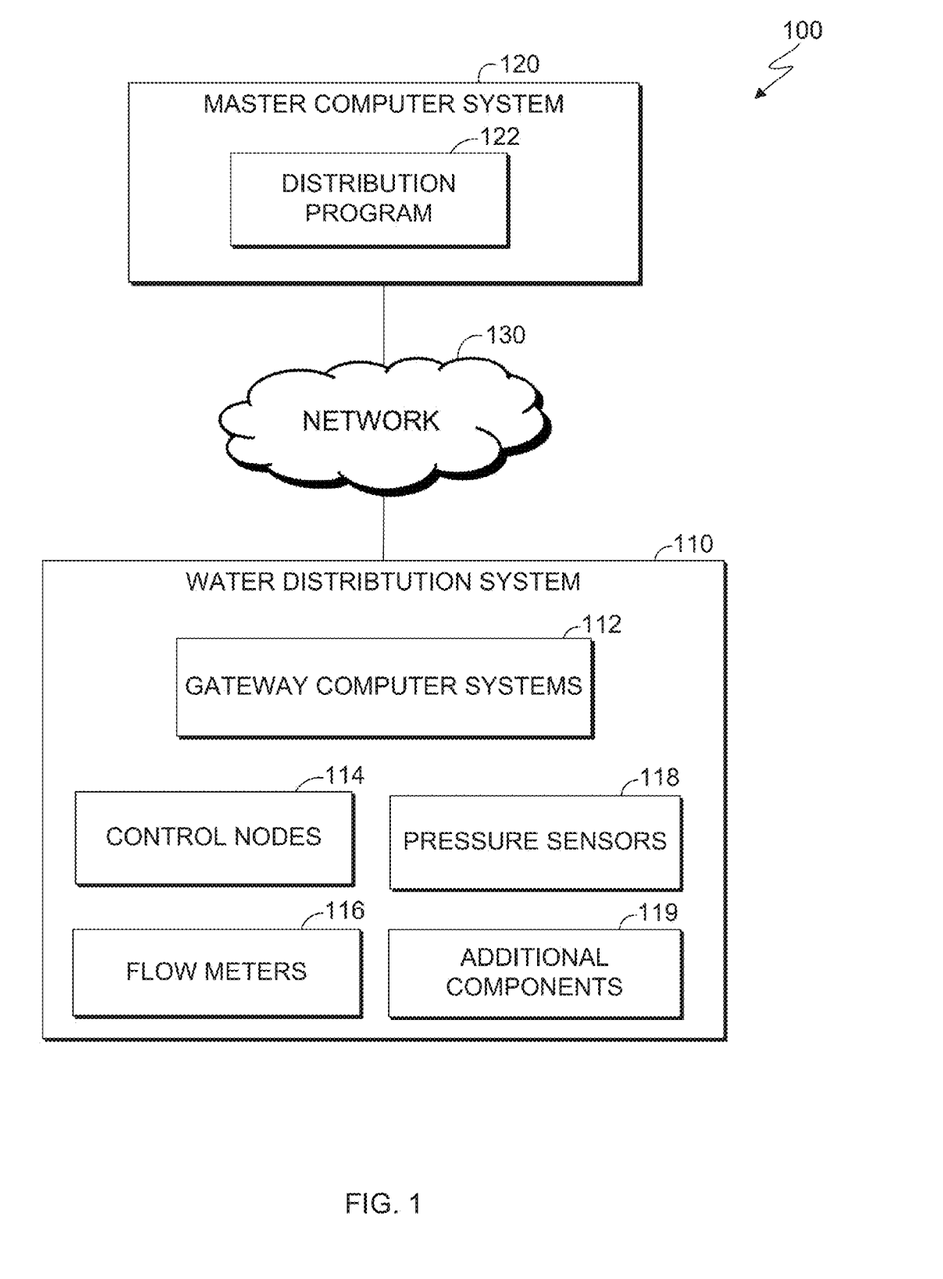
FIG. 1 is a block diagram of a water distribution environment, in accordance with an embodiment of the present invention.

FIG. 1 is a functional block diagram of water distribution environment 100, in accordance with an embodiment of the present invention. Water distribution environment 100 includes master computer system 120 and water distribution system 110, which includes gateway computer systems 112, all interconnected by network 130. Gateway computer systems 112 and master computer system 120 can be desktop computers, laptop computers, specialized computer servers, or any other computer systems known in the art. In certain embodiments, gateway computer systems 112 and master computer system 120 represent computer systems utilizing clustered computers and components to act as a single pool of seamless resources when accessed through network 130. In certain embodiments, gateway computer systems 112 and master computer system 120 represent virtual machines. In general, gateway computer systems 112 and master computer system 120 are representative of any electronic device, or combination of electronic devices, capable of executing machine-readable program instructions, as discussed in greater detail with regard to FIG. 8.

Master computer system 120 includes distribution program 122. In this embodiment of the present invention, distribution program 122 issues a water distribution schedule to water distribution system 110, and receives feedback data (e.g., data indicating compliance with water distribution schedules and/or any discrepancies) from water distribution system 110 via network 130. Distribution program 122 can analyze discrepancies and transmit new instructions for remote diagnostics and/or new water distribution schedules.

Water distribution system 110 comprises a hierarchical structure. In this embodiment of the present invention, the hierarchical structure comprises one or more zones. The term "zone", as used herein, refers to a grouping of one or more pressure sensors 118, one or more flow meters 116, and one or more of additional components 119 (e.g., emitters, drip lines, infrastructure, etc.) for a particular target water distribution area, all of which are controlled by one of control nodes 114. Each of gateway computer systems 112 can be operatively coupled (e.g., via wired connections, wireless connections, and/or combinations of both) to control nodes 114 of one or more zones. The phrases, "target water distribution area" or "target water distribution areas", as used herein, refers to desired areas for water distribution during the operation of water distribution system 110.

In this manner, upon receiving a water distribution schedule from distribution program 122, each of gateway computer systems 112 can communicate with one or more zones to facilitate water distribution of those particular target water distribution areas through drip lines, as well as receive feedback data from those zones to transmit back to distribution program 122. The term "drip line," as used herein, refers to one or more conduits (e.g., flexible or rigid tubes, pipes, etc.) through which liquids can be transported between two or more components of a system. Each drip line may comprise one or more emitters through which liquid is dispensed. For example, emitters may comprise holes or nozzles disposed along the lengths of the drip lines.

Control nodes 114 receive and execute instructions from gateway computer systems 112 to actuate (i.e., open and close) valves. In this embodiment of the present invention, control nodes 114 also receive flow response feedback information from flow meters 116 and pressures sensors 118, and transmit the flow response feedback information to gateway computer systems 112. Each of control nodes 114 may comprise one or more electronic circuits (e.g., a microcontroller or other computer system) operatively coupled with a valve, one or more flow meters 116, and one or more pressure sensors 118. The electronic circuits of each of control nodes 114 may also be operatively coupled with other components, such as a control panel to facilitate input of control information. The valve operatively coupled to each of control nodes 114 may be operated electromechanically through a solenoid (e.g., a three-port solenoid valve).

Control nodes 114 can be operatively coupled to one or more other control nodes 114 in order to relay data (e.g., flow response feedback information). For example, as discussed in greater detail later in this specification, control nodes 114 may be operatively coupled to one another in series and/or in parallel to relay data to and from gateway computer systems 112. In general, control nodes 114 may comprise any wired or wireless networking technologies known in the art (e.g., mesh, series/parallel, etc.) to facilitate transfer of data with other control nodes 114 and with gateway computer systems 112.

Flow meters 116 can measure volumetric flow of liquid through one or more drip lines at a specified interval. In this embodiment, each of flow meters 116 is deployed for a particular zone and measures the total volumetric flow of liquid through the one or more drip lines within that zone. Flow meters 116 may transmit flow feedback response information to operatively coupled control nodes 114. For example, flow meters 116 can measure changes in flow behavior, and sample flow rates at least every 15 minutes at a minimum resolution of 0.01 gallons per minute. Flow meters 116 may be implemented with mechanical flow meters, pressure based flow meters, optical flow meters, thermal mass flow meters and/or any other flow meter known in the art. In another embodiment of the present invention, each of flow meters 116 monitors multiple water distribution conduits (e.g., supply lines, drip lines, etc.) that branch out from a central point. The central point may be an area where supply lines are operatively connected to supply lines. Furthermore, water distribution conduits that may branch from other water distribution conduits create complex arrangements and distribution for each one of flow meters 116 to monitor.

Pressure sensors 118 can measure pressure of liquid within one or more drip lines at a specified interval. In this embodiment, each of pressure sensors 118 is deployed for a particular zone, and measures the pressure of liquid within one or more drip lines within that zone. For example, one of pressure sensors 118 may be deployed for every six drip lines, every four drip lines, every two drip lines, or each individual drip line, depending on the desired granularity of pressure measurements within each zone. Pressure sensors 118 transmit flow response feedback information with regard to pressure to the control nodes 114 to which they are operatively coupled. For example, pressure sensors 118 can measure pressure changes and changes in flow behavior every 5 milliseconds at a minimum resolution of 0.1 pounds per square inch. Pressure sensors 118 may be implemented with force collector types of pressure sensors (e.g., capacitive, electromagnetic, etc.), or any other type of electronic pressure sensor known in the art. A combination of pressure sensors 118 may be used to measure static pressure changes and transient changes within water distribution system 110.

In general, pressure sensors 118, flow meters 116, and/or any other combination of sensing devices (i.e., sensors, meters, and combinations thereof, can be considered sensing points) can be deployed in a manner such that the sensing points are distributed on a uniform grid (i.e., a plot of land). Each sensing point can monitor valves that are disposed within a proximity of the sensing point throughout water distribution system 110.

In certain embodiments of the present invention, one of flow meters 116 and/or one of pressure sensors 118 does not accurately monitor the flow response feedback information during an operation of the water distribution system. An observable volumetric flow may be below the detection limit of one of flow meters 116, and/or the observable pressure change may be below the detection limit of one or more pressure sensors 118. For example, in another instance, one or more of flow meters 116 and/or one or more pressures sensors 118 may be defective or non-operable. In these embodiments of the present invention, distribution program 122 uses a collection of resources from one or more flow sensors 116 and one or more pressure sensors 118 to facilitate the monitoring of the flow response feedback information. Additionally, distribution program 122 may transmit instructions comprising commands to monitor a particular water distribution area for an extended amount of time until either one or more flow meters 116 or one or more pressure sensors 118 can accurately monitor the flow response feedback information. For example, for methods to detect defective zones and valves, as described in greater detail with regard to FIGS. 3 and 4, a plurality of flow sensors 116 and pressure sensors 118 are employed. In certain embodiments of the present invention, during an operation to detect defective zones and valves, one or more flow meters 116 may not accurately monitor the flow response feedback information. In order to affirmatively establish that a particular zone or valve is defective, then distribution program 122 may utilize one or more pressure sensors 118 and analyze transient pressure responses to determine whether the target water distribution area is defective. As described in greater detail with regard to FIG. 3, the transient pressure responses are responses from sequentially opening and closing additional components 119 (e.g., valves).

Additional components 119 can collectively represent other components of water distribution system 110 that make up an infrastructure of water distribution system 110, and otherwise facilitate operation thereof. For example, in this embodiment of the present invention, additional components 119 include emitters, drip lines, and miscellaneous conduits, connectors, and other valves not specifically discussed herein (e.g., check valves in drip lines to prevent backflow of liquid). Additional components 119 can also include additional types of sensors to monitor leaks (e.g., soil moisture sensors, optical sensors, etc.).

It should be appreciated that for illustrative purposes, FIG. 1 does not show other computer systems and elements which may be present when implementing embodiments of the present invention.

Figure 2:
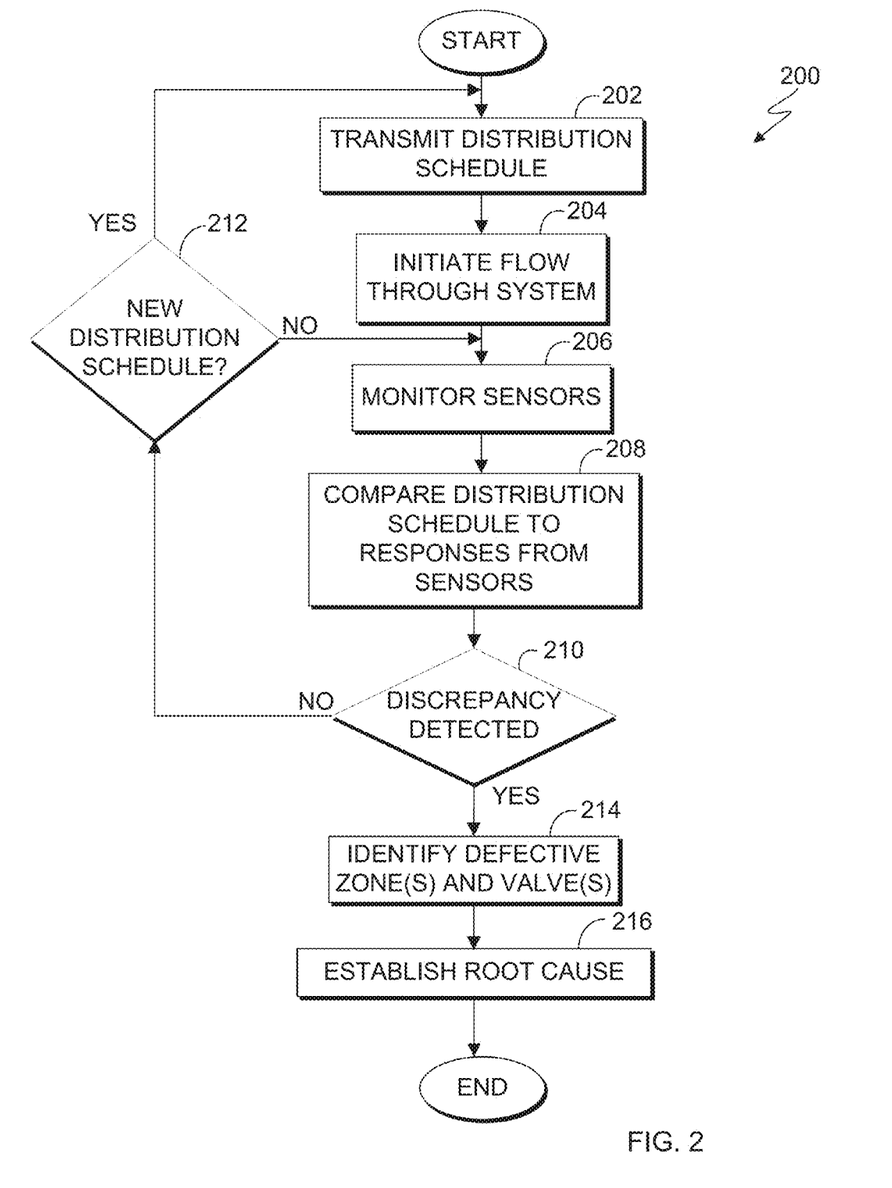
FIG. 2 is a flowchart illustrating operational steps for routinely monitoring the water distribution system, in accordance with an embodiment of the present invention.

FIG. 2 is a flowchart 200 illustrating operational steps for distribution program 122 to monitor water distribution system 110, in accordance with an embodiment of the present invention.

In step 202, distribution program 122 transmits a water distribution schedule to gateway computer systems 112 via network 130. Distribution program 122 may receive the water distribution schedule from a user, a remote server, or it may be stored within a repository of distribution program 122. In this embodiment, the water distribution schedule comprises one or more instructions that instruct control nodes 114 to actuate (i.e., open or close) valves at specified times and for specified durations. Each water distribution schedule can be associated with expected flow behavior of water distribution system 110, which represents the flow behavior that should be observed if water distribution system 110 is operating properly according to the water distribution schedule. In various embodiments of the present invention, expected flow behavior is based on theoretical models, historical models, experimental results, and/or combinations thereof.

In step 204, distribution program 122 initiates flow of liquid through water distribution system 110. In this embodiment of the present invention, distribution program 122 initiates flow by signaling gateway computer systems 112 to transmit the water distribution schedule instructions to control nodes 114.

In step 206, distribution program 122 monitors flow meters 116 and pressure sensors 118 for each zone. In this embodiment of the present invention, each of gateway computer systems 112 receives flow feedback response information corresponding to flow behavior of a plurality of control nodes 114, and transmits aggregate flow feedback response information to distribution program 122 via network 130, which distribution program 122 then uses to monitor flow meters 116 and pressure sensors 118.

In step 208, distribution program 122 compares the expected flow behavior for the water distribution schedule to the flow feedback response information received for each of control nodes 114 on a per-zone basis. In another embodiment of the present invention, gateway computer systems 112 compares the water distribution schedule to flow response feedback information and transmits the comparison results to distribution program 122. Designating gateway computer systems 112 to perform the comparison may reduce the computational load of distribution program 122.

In yet another embodiment of the present invention, control nodes 114 compares the water distribution schedule to flow feedback response information and transmits the comparison results to gateway computer systems 112 to reduce the computational load on distribution program 122 and gateway computer systems 112.

In step 210, distribution program 122 determines whether there is a discrepancy between the expected flow behavior for the water distribution schedule and the flow feedback response information received from gateway computer systems 112. For example, a discrepancy is detected if there are one or more defective valves (e.g., stuck open or closed), leaking fittings, clogged emitters, and/or excessive amounts of foreign material in drip lines (e.g., soil). The discrepancy may be a result of a departure of the measured flow behaviors to expected flow behaviors, which can be detected by distribution program 122. In one embodiment, distribution program 122 employs pipeline modeling software (e.g., EPANET) to assess a reservoir, water flow, pressure distribution, and steady state leaks in water distribution system 110. Distribution program 122 may also employ model flow relationships (i.e., calculated using Navier, Stokes, and Bernoulli equations) to more frequently monitor transient behavior. For example, distribution program 122 may use the model flow relationships to determine expected flow behaviors resulting from pressure changes in drip lines (e.g., if a valve is opened, local pressure might drop by 10 Pa) and reflections of pressure waves from components in water distribution system 110 (e.g., walls, drip-lines, closed solenoid valves, check valves etc.).

If, in step 210, distribution program 122 does not detect a discrepancy between water distribution schedule and flow feedback response information, then, in step 212, distribution program 122 may receive a new water distribution schedule. For example, a new water distribution schedule may include new command instructions for control nodes 114, resulting in a new expected flow behavior for the new water distribution schedule.

If, in step 210, distribution program 122 detects a discrepancy, then in step 214, distribution program 122 identifies defective zones and valves. In this embodiment, distribution program 122 may transmit new instructions to gateway computer systems 112 to change the flow behavior in certain zones and use the flow response feedback information to identify defective zones and valves by process of elimination techniques. Identification of defective zones and valves is discussed in greater detail with regard to FIGS. 3 and 4.

If, in step 212, distribution program 122 receives a new schedule, then, in step 202, master computer system will transmit the new water distribution schedule to water distribution system 110.

If, in step 212, distribution program 122 does not receive a new schedule, then, in step 206, distribution program 122 continues to monitor flow meters 116 and pressure sensors 118. Thus, a feedback loop can be employed by distribution program 122 to continually compare measured flow response feedback information with the water distribution schedule.

In step 216, distribution program 122 establishes one or more root causes of the discrepancy detected in water distribution system 110. In this embodiment of the present invention, distribution program 122 establishes root causes by analyzing flow response feedback information containing the one or more discrepancies, and comparing the flow response feedback information to a library of historical or theoretically modeled flow response feedback information patterns. For example, if distribution program 122 identifies a matching pattern in the library, the root cause of the current discrepancy may be the same. In another embodiment of the present invention, distribution program 122 analyzes flow response feedback information to confirm that a communication problem is not causing, or contributing to, the discrepancy.

In certain embodiments of the present invention, flow response feedback information patterns does not comport with the library. In this case, distribution program 122 may model and analyze the flow response feedback pattern, and determine the flow response feedback pattern that most closely matches a pattern in the library. In another embodiment of the present invention, if a matching pattern is not found, distribution program 122 saves the pattern for future comparisons.

Figure 3:
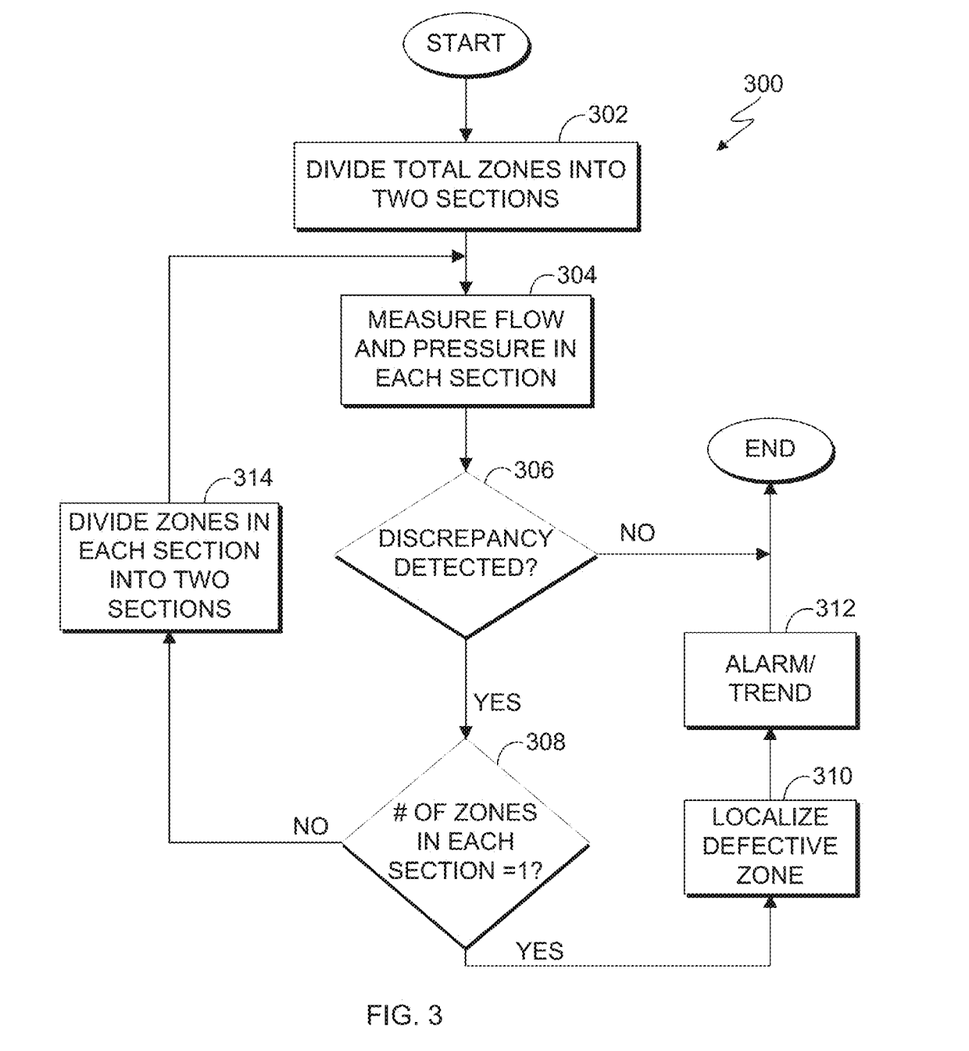
FIG. 3 is a flowchart illustrating operational steps for identifying defective zones in the water distribution system, in accordance with an embodiment of the present invention.

FIG. 3 is a flowchart 300 illustrating operational steps for distribution program 122 to identify defective zones in water distribution system 110, in accordance with an embodiment of the present invention. For example, the operational steps of FIG. 3 may be performed by distribution program 122 at step 214 of FIG. 2.

In step 302, distribution program 122 transmits instructions to control nodes 114. The instructions may comprise command logic to divide the total number of zones in water distribution system 110 to gateway computer systems 112. In an embodiment of the present invention, gateway computer systems 112 transmit command logic to control nodes 114 to divide the total number of zones into two sections.

In step 304, distribution program 122 receives flow feedback response information from flow meters 116 and pressure sensors 118 of the zones of each section. In an embodiment of the present invention, distribution program 122 receives aggregate flow feedback response information from gateway computer systems 112.

In step 306, distribution program 122 analyzes each section and determines whether a discrepancy is detected between expected flow behavior for the water distribution schedule and the flow feedback response information received by control nodes 114 for that section.

If, in step 306, distribution program 122 does not detect a discrepancy in that section of water distribution system 110, then that section may not contain a discrepancy. In another embodiment of the present invention, distribution program 122 does not detect a discrepancy because the flow behavior is below the detection limit for flow meters 116 and pressure sensors 118.

If, in step 306, distribution program 122 detects a discrepancy in that section, then in step 308, distribution program 122 will determine whether the identified section contains more than one zone. In an embodiment of the present invention, more than one discrepancy are detected in zones of more than one section. Thus, if in step 306, distribution program 122 detects discrepancies in multiple sections, distribution program 122 may proceed with subsequent processing of the sections in parallel, in series, or combinations thereof. The expected flow behavior or some other acceptable threshold during the operation in accordance with the distribution schedule can be determined theoretically, experimentally, and/or using combinations of both techniques.

If, in step 308, distribution program 122 determines that the identified section does contain more than one zone, then in step 314 master distribution program 122 divides the zones in that identified section into two sections, each section comprising a whole number of zones. In step 304, continues to measure and compare expected flow behavior for the water distribution schedule to the flow response feedback information for each section. For example, if in step 308 three zones are detected, then distribution program 122 may divide three zones into two sections (one section comprising two zones and the second section comprising the other one zone).

If, in step 308, distribution program 122 determines there is one zone in the identified section, then in step 310, distribution program 122 will localize the defective zone.

In step 312, distribution program 122 alarms an operator and/or establishes a trend for the defective zone. In an embodiment of the present invention, distribution program 122 visually displays the zone location on a map, includes a timestamp, and monitors its performance and provides metrics (i.e., gallons of wasted water). Distribution program 122 may establish a trend by accessing models of behavior that describe defective situations (e.g., non-responsive valve, impurity in system, broken pipe, etc.) as later specified in FIG. 5. Establishing a trend may expedite the process for an administrative user to locate or identify a defective area in water distribution system 110, as well as provide real-time predications of reasons for defective areas in water distribution system 110.

For example, water distribution system 110 may have a total of 12 zones, 12 control nodes and 12 solenoid valves. Distribution program 122 may perform operational step 302, and divides the number of total zones (12 zones) into two sections (i.e., section "1A" and "1B"). Section 1A and section 1B have 6 zones each. In step 306, distribution program 122 may determine that section 1A has a discrepancy in flow behavior. In step 308, distribution program 122 can determine that if the number of zones in section 1A does not equate to one, accordingly, in step 314, water distribution computer 119 divides section 1A into two more sections (i.e., section "1AB" and section "1AC"). If section 1AB or section 1AC then have discrepancies, distribution program 122 can iteratively divide the section until no more than one zone remains in each section, thereby localizing one or more defective zones.

Figure 4:
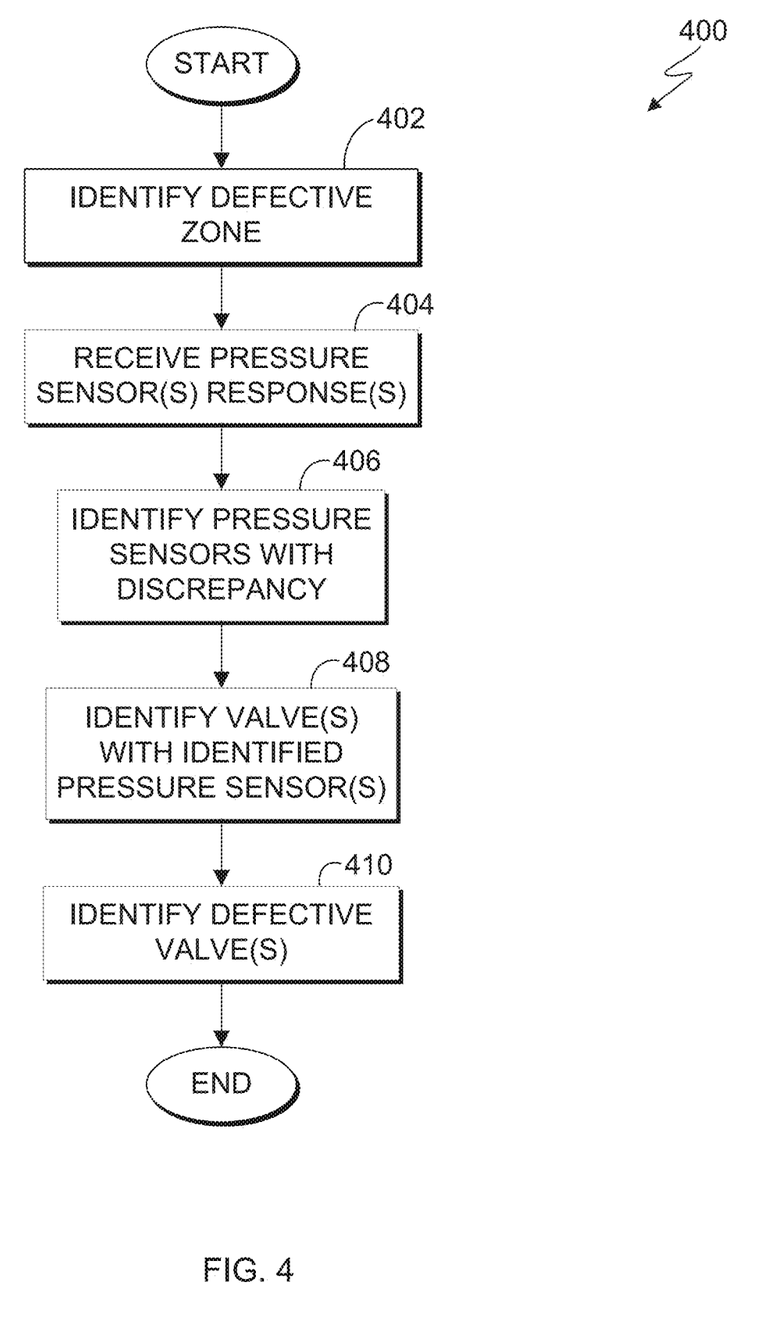
FIG. 4 is a flowchart illustrating operational steps for identifying defective valves, in accordance with an embodiment of the present invention.

FIG. 4 is a flowchart 400 illustrating operational steps for distribution program 122 to identify defective zones and valves in water distribution system 110. For example, the operational steps of FIG. 4 may be performed by distribution program 122 at step 214 of FIG. 2.

In step 402, distribution program 122 identifies defective zones in water distribution system 110. In this embodiment of the present invention, distribution program 122 analyzes flow meters 116 flow response feedback information, compares expected flow behavior for the water distribution schedule to the flow response feedback information, and identifies discrepancies between the two.

In step 404, distribution program 122 receives responses of pressure sensors 118 from zones identified in step 402. Responses of pressure sensors 118 may include information pertaining to the systematic process of opening and closing valves in water distribution system 110. In an embodiment of the present invention, distribution program 122 receives flow response feedback information of pressure sensors 118 from gateway computer systems 112. Additionally, distribution program 122 can compare expected flow behavior in regard to pressure and with flow response feedback information with respect to pressure.

In step 406, distribution program 122 identifies pressure sensors 118 in water distribution system 110 with one or more discrepancies. In this embodiment of the present invention, pressure sensors 118 may receive flow feedback response information that differs from the expected flow behavior, in accordance with the distribution schedule for the water distribution system operation. In an embodiment of the present invention, defective valves transmits signals to control nodes with greater amounts of control noise. Accordingly, distribution program 122 can analyze signal-to-noise ratios for the information received from the control nodes to identify defective valves.

In step 408, distribution program 122 identifies valves that are capable of affecting the pressures at identified pressure sensors 118 in step 406. In another embodiment of the present invention, distribution program 122 receives valve identification information for defective pressure sensors 118 from gateway computer systems 112.

In step 410, distribution program 122 identifies one or more defective valves. In an embodiment of the present invention, distribution program 122 identifies defective valves by analyzing and processing pressure envelopes for each valve in step 408 associated with pressure sensors 118 detected in step 404. The term "pressure envelope", as used herein, refers to a curve outlining extremes in amplitude of pressure variations measured by a pressure sensor over a certain time domain. For example, a pressure envelope for a particular sensor may describe the pressure variations measured by the sensor over a time domain ranging from actuating (i.e., opening/closing) an associated valve to the pressure sensor reaching a steady state. Typically, the pressure responses of pressure sensors 118 will result in distinct pressure envelopes depending on which valves are open and/or closed. Accordingly, a library of expected pressure envelopes can be stored for different combinations of valves being open and closed and, in step 410, distribution program 122 can compare the current pressure envelope for each valve to the library to identify one or more valves whose pressure envelopes do not match their expected pressure envelopes. The operational steps performed by distribution program 122 in FIG. 4 may be performed for each identified defective zone sequentially or simultaneously for multiple defective zones.

Figure 5:
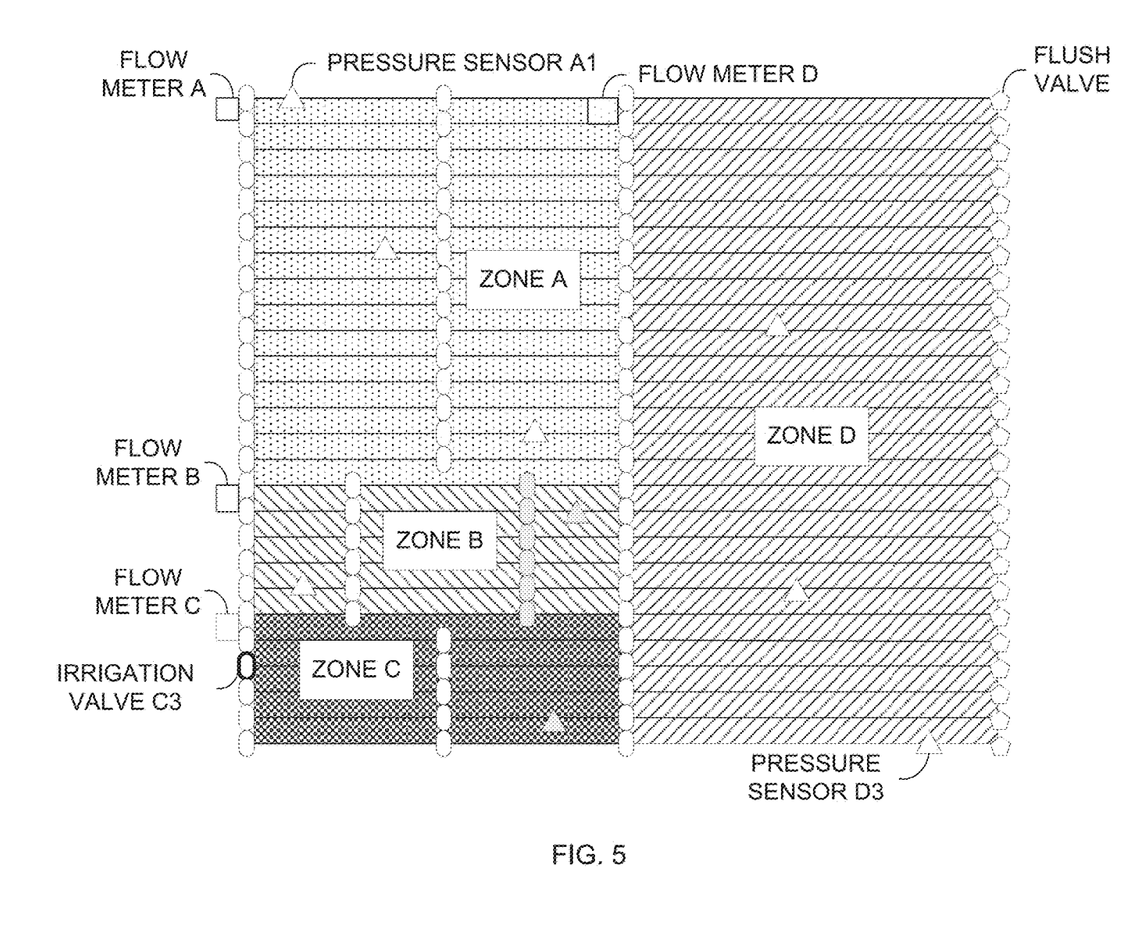
FIG. 5 is a diagram of a plurality of zones, in accordance with an embodiment of the present invention.

FIG. 5 is a diagram that provides an example of zones in water distribution system 110, in accordance with an embodiment of the present invention. In this example, a plurality of pressure sensors 118 (e.g., Pressure Sensor D3) are disposed throughout each zone (e.g., Zone A, Zone B, Zone C, and/or Zone D). The number and location of pressure sensors 118 and flow meters 116 may be modified. In certain embodiments, the number and location of pressure sensors 118 and flow meters 116 are determined by deploying the minimum number of pressure sensors 118 and flow meters 116 required to establish detection zones that cover all portions of the target irrigation area, while minimizing overlap of detection zones and ensuring that each of the sensors operates at a signal to noise ratio of at least one. Pressure sensors 118 and flow meters 116 may be deployed in the drip lines or in a supply line where a double drip line system is employed.

Figure 6A:
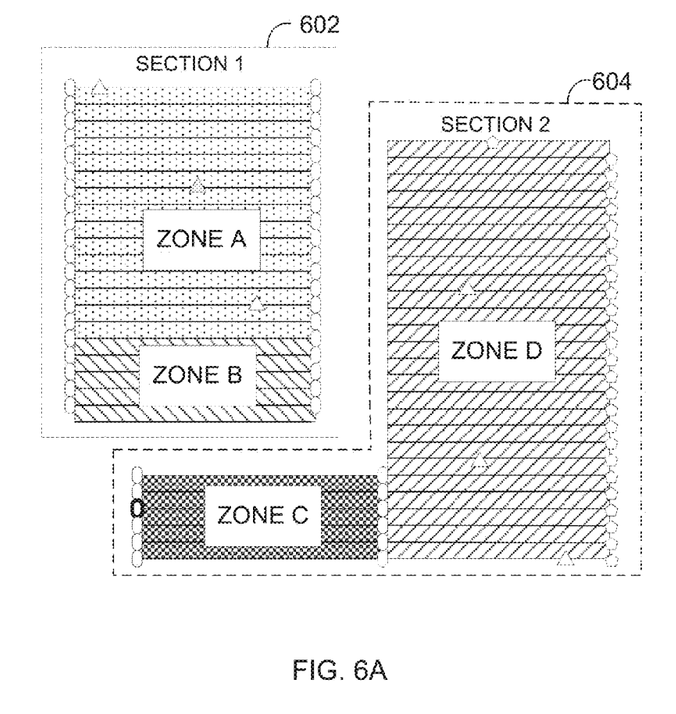
FIGS. 6A-6B are diagrams of a plurality of zones separated into sections, in accordance with an embodiment of the present invention.
Figure 6B:
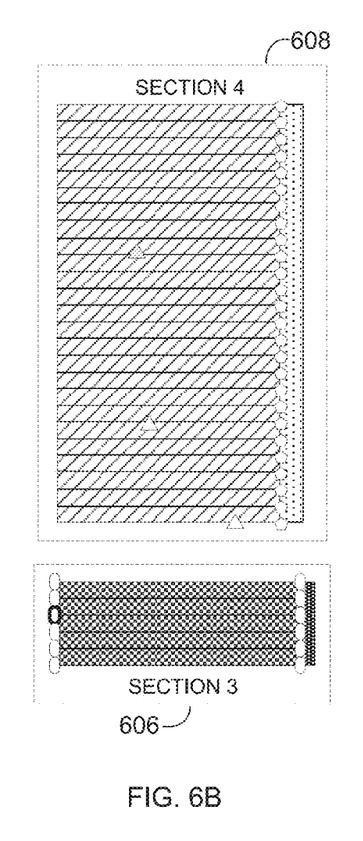

FIGS. 6A-6B provide an illustrative example of distribution program 122 performing operational steps as specified earlier in this specification with regard to FIG. 3, in accordance with embodiments of the present invention. In FIG. 6A, distribution program 122 divides the total zones (i.e., zones A, B, C, and D) into two sections, as specified in step 302. Section 1 comprises zones A and B; section 2 comprises zones C and D. Then, distribution program 122 measures flow response feedback information (e.g., flow rates, gauge pressure, etc.) in section 1 and subsequently in section 2, as specified in step 304. Distribution program 122 can detect a discrepancy in section two (in FIG. 6A irrigation valve C3 in zone C is bolded to represent a defective valve), as specified in step 306. Then, distribution program 122 may determine the number of zones in the identified section with a discrepancy. In this exemplary embodiment, section 2 has two zones. The number of zones in section 2 is greater than one, so distribution program 122 can divide the zones into two more sections (section 3 and section 4) as illustrated in FIG. 6B, and as specified in step 314. Distribution program 122 can measure flow response feedback information in section 3 and subsequently in section 4, as described in step 304. Then, distribution program 122 may detect a discrepancy in section 3. As described in step 308, distribution program 122 determines that the number of zones in section 3 is equal to one and, accordingly, distribution program 122 may proceed with subsequent processing.

Figure 7:
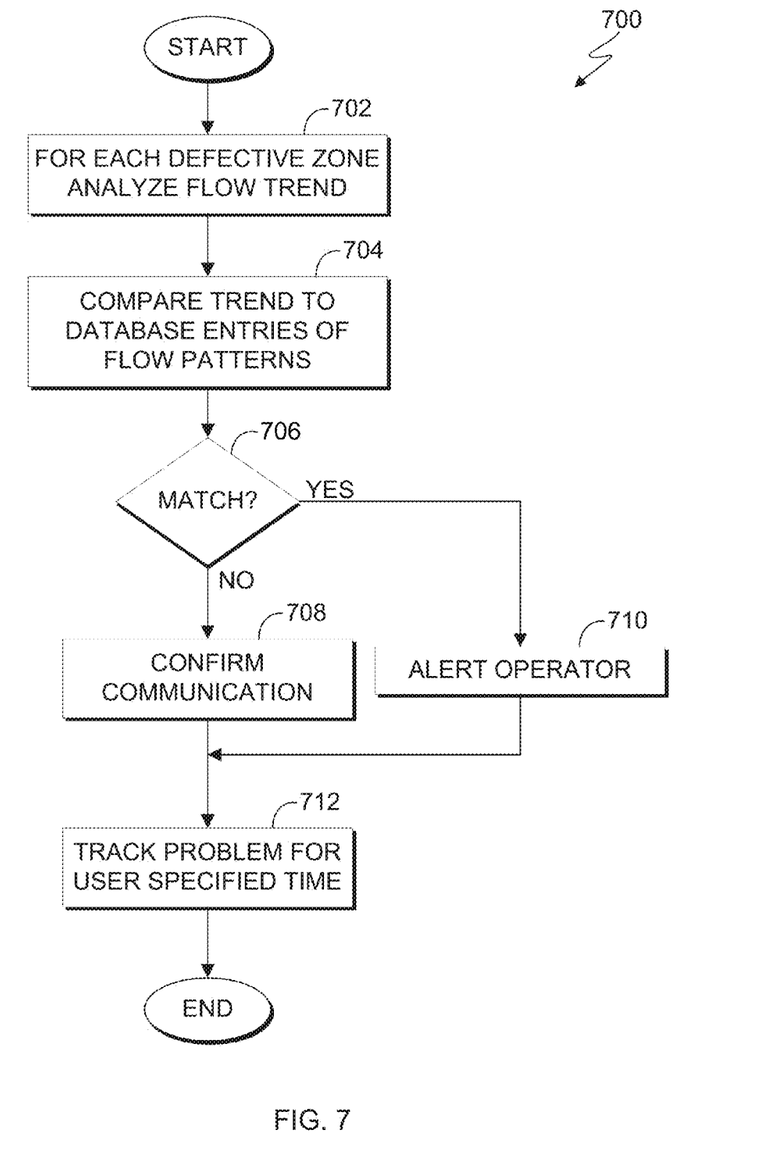
FIG. 7 is a flowchart illustrating operational steps for establishing trends in the variable water distribution system, in accordance with an embodiment of the present invention.

FIG. 7 is a flowchart 700 illustrating the operational steps for establishing trends in water distribution system 110, in accordance with an embodiment of the present invention. Trend establishment may be performed after distribution program 122 identifies a defective zone or valve. For example, the operational steps of FIG. 7 may be performed by distribution program 122 at step 312 of FIG. 3. In another embodiment, gateway computer systems 112 establishes trends in water distribution system 110.

In step 702, distribution program 122 analyzes the flow behavior for each defective zone. In another embodiment, gateway computer systems 112 may analyze the flow behavior for their respective defective zones.

In step 704, distribution program 122 compares flow response feedback information for a defective zone to entries of a library of expected flow behavior for a water distribution schedule to simulate different causes for discrepancies (i.e., trends).

In step 706, distribution program 122 determines whether the flow response feedback information for the defective zone matches an entry of the library of expected flow behavior for the water distribution schedule.

If, in step 706, distribution program 122 does not find an entry of the library of expected flow behavior for the water distribution schedule matching flow response feedback information for the defective zone matches, then in step 708, distribution program 122 establishes communication to control nodes 114.

If, in step 706, distribution program 122 matches an entry of the library of expected flow behavior for the water distribution schedule matching flow response feedback information for the defective zone, then in step 710, distribution program 122 alerts an operator signaling the trend that was established.

In step 708, distribution program 122 determines that the communicative network of water distribution system 110 is not defective. Distribution program 122 may establish communication in order to eliminate communication-related issues as a possible reason for a defective area in water distribution system 110.

In step 712, distribution program 122 tracks the problem for a user specified amount of time. In an embodiment, distribution program 122 visually displays the zone location on a map, includes a timestamp, and monitors its performance and provides metrics (i.e., gallons of wasted water).

Figure 8:
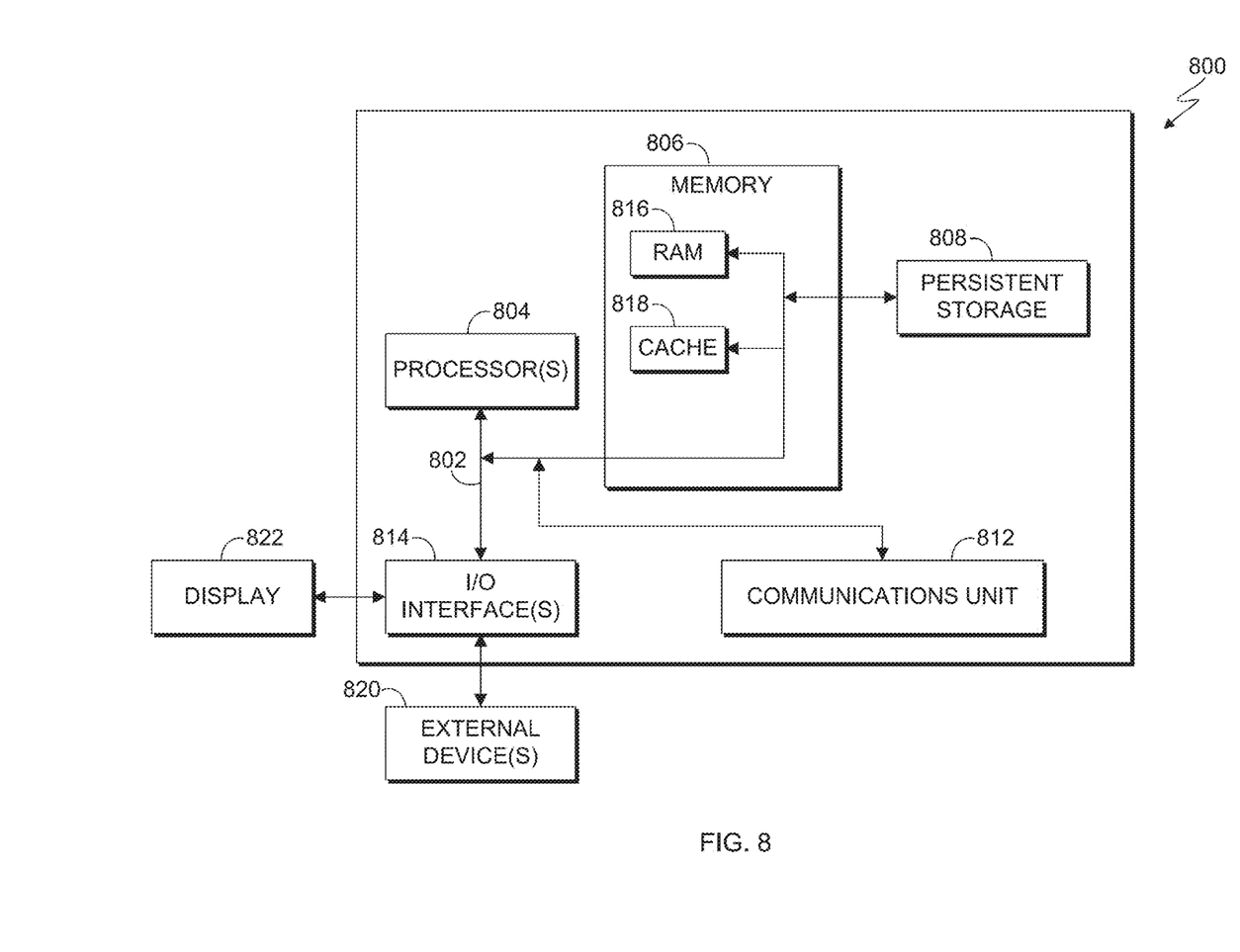
FIG. 8 is a block diagram of internal and external components of the computer systems of FIG. 1, in accordance with an embodiment of the present invention.

FIG. 8 is a block diagram of internal and external components of a computer system 800, which is representative the computer systems of FIG. 1, in accordance with an embodiment of the present invention. It should be appreciated that FIG. 8 provides only an illustration of one implementation and does not imply any limitations with regard to the environments in which different embodiments may be implemented. In general, the components illustrated in FIG. 8 are representative of any electronic device capable of executing machine-readable program instructions. Examples of computer systems, environments, and/or configurations that may be represented by the components illustrated in FIG. 8 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 800 includes communications fabric 802, which provides for communications between one or more processors 804, memory 806, persistent storage 808, communications unit 812, and one or more input/output (I/O) interfaces 814. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 816 and cache memory 818. In general, memory 806 can include any suitable volatile or non-volatile computer-readable storage media. Software is stored in persistent storage 808 for execution and/or access by one or more of the respective processors 804 via one or more memories of memory 806.

Persistent storage 808 may include, for example, a plurality of magnetic hard disk drives. Alternatively, or in addition to magnetic hard disk drives, persistent storage 808 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 808 can also be removable. For example, a removable hard drive can be used for persistent storage 808. Other examples include optical and magnetic disks, thumb drives, and smart cards that are inserted into a drive for transfer onto another computer-readable storage medium that is also part of persistent storage 808.

Communications unit 812 provides for communications with other computer systems or devices via a network (e.g., network 130). In this embodiment, communications unit 812 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 812 (e.g., via the Internet, a local area network or other wide area network). From communications unit 812, the software and data can be loaded onto persistent storage 808.

One or more I/O interfaces 814 allow for input and output of data with other devices that may be connected to computer system 800. For example, I/O interface 814 can provide a connection to one or more external devices 820 such as a keyboard, computer mouse, touch screen, virtual keyboard, touch pad, pointing device, or other human interface devices. External devices 820 can also include portable computer-readable storage media such as, for example, thumb drives, portable optical or magnetic disks, and memory cards. I/O interface 814 also connects to display 822.

Display 822 provides a mechanism to display data to a user and can be, for example, a computer monitor. Display 822 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for performing diagnostics on a water distribution system, the method being programmed with memory-stored instructions configured to be executed by one or more processors implementing the method, comprising:
    transmitting, by one or more computer processors, a water distribution schedule to a plurality of control nodes of a water distribution system, wherein the water distribution system comprises a plurality of zones;
    determining, by one or more computer processors, whether the water distribution system is operating in accordance with the water distribution schedule; and
    responsive to determining that the water distribution system is not operating in accordance with the water distribution schedule, identifying, by one or more computer processors, defective components in the water distribution system wherein identifying defective components in the water distribution system comprises:
        identifying, by a computer processor, one or more of the zones as defective zones;
        identifying, by a computer processor, a defective valve of each defective zone, wherein identifying a defective valve comprises:
            generating a pressure envelope, by one or more computer processors, for a first pressure sensor within a defective zone;
            determining, by one or more computer processors, whether the generated pressure envelope matches a pressure envelope stored in a library of pressure envelopes; and
            responsive to determining that the generated pressure envelope matches a pressure envelope stored in the library of pressure envelopes, identifying the first pressure sensor as defective.

2. The method of claim 1, wherein the water distribution schedule comprises one or more instructions for one or more control nodes to actuate a valve operatively coupled to a drip line.

3. The method of claim 1, wherein determining, by one or more computer processors, whether the water distribution system is operating in accordance with the water distribution schedule further comprises:
    receiving, by one or more computer processors, flow response feedback information measured by a plurality of sensors; and
    determining, by one or more computer processors, whether the flow response feedback information comports with expected flow behavior associated with the water distribution schedule.

4. The method of claim 1, wherein each zone of the plurality of zones comprises a grouping of a portion of the plurality of control nodes, one or more pressure sensors, one or more flow meters, and one or more drip lines for a particular target water distribution area.

5. The method of claim 4, wherein identifying, by one or more computer processors, defective components in the system further comprises:
receiving, by one or more computer processors, flow response feedback information from the one or more pressure sensors and one or more flow meters of each zone;
comparing, by one or more computer processors, the flow response feedback information received from the one or more pressure sensors and one or more flow meters of each zone with expected flow behavior associated with the water distribution schedule; and
identifying as defective, by one or more computer processors, each zone for which received flow response feedback information does not comport with expected flow behavior associated with the water distribution schedule.

6. A computer program product for performing diagnostics on a water distribution system, the computer program product comprising:
one or more computer readable storage media and program instructions stored on the one or more computer readable storage media, the program instructions comprising:
program instructions to transmit a water distribution schedule to a plurality of control nodes of a water distribution system, wherein the water distribution system comprises a plurality of zones;
program instructions to determine whether the water distribution system is operating in accordance with the water distribution schedule; and
program instructions to, responsive to determining that the water distribution system is not operating in accordance with the water distribution schedule, identify defective components in the system wherein identifying defective components in the water distribution system comprises:
identifying, by a computer processor, one or more of the zones as defective zones;
identifying, by a computer processor, a defective valve of each defective zone, wherein identifying a defective valve comprises:
generating a pressure envelope, by one or more computer processors, for a first pressure sensor within a defective zone;
determining, by one or more computer processors, whether the generated pressure envelope matches a pressure envelope stored in a library of pressure envelopes; and
responsive to determining that the generated pressure envelope matches a pressure envelope stored in the library of pressure envelopes, identifying the first pressure sensor as defective.

7. The computer program product of claim 6, wherein the water distribution schedule comprises one or more instructions for one or more control nodes to actuate a valve operatively coupled to a drip line.

8. The computer program product of claim 6, wherein the program instructions to determine whether the water distribution system is operating in accordance with the water distribution schedule comprise:
program instructions to receive flow response feedback information measured by a plurality of sensors; and
program instructions to determine whether the flow response feedback information comports with expected flow behavior associated with the water distribution schedule.

9. The computer program product of claim 6, wherein each zone of the plurality of zones comprises a grouping of a portion of the plurality of control nodes, one or more pressure sensors, one or more flow meters, and one or more drip lines for a particular target water distribution area.

10. The computer program product of claim 6, wherein the program instructions to identify defective components in the system further comprise:
program instructions to receive flow response feedback information from the one or more pressure sensors and one or more flow meters of each zone;
program instructions to compare the flow response feedback information received from the one or more pressure sensors and one or more flow meters of each zone with expected flow behavior associated with the water distribution schedule; and
program instructions to identify as defective each zone for which received flow response feedback information does not comport with expected flow behavior associated with the water distribution schedule.

11. A computer system for performing diagnostics on a water distribution system, the computer system comprising:
one or more computer processors;
one or more computer readable storage media; and
program instructions stored on the computer readable media for execution by at least one of the one or more processors, the program instructions comprising:
program instructions to transmit a water distribution schedule to a plurality of control nodes of a water distribution system, wherein the water distribution system comprises a plurality of zones;
program instructions to determine whether the water distribution system is operating in accordance with the water distribution schedule; and
program instructions to, responsive to determining that the water distribution system is not operating in accordance with the water distribution schedule, identify defective components in the system, wherein identifying defective components in the system comprises:
identifying, by a computer processor, one or more of the zones as defective zones; and
identifying, by a computer processor, a defective valve of each defective zone, wherein identifying a defective valve comprises:
generating a pressure envelope, by one or more computer processors, for a first pressure sensor within a defective zone;
determining, by one or more computer processors, whether the generated pressure envelope matches a pressure envelope stored in a library of pressure envelopes; and
responsive to determining that the generated pressure envelope matches a pressure envelope stored in the library of pressure envelopes, identifying the first pressure sensor as defective.

12. The computer system of claim 11, wherein the water distribution schedule comprises one or more instructions for one or more control nodes to actuate a valve operatively coupled to a drip line.

13. The computer system of claim 11, wherein the program instructions to determine whether the water distribution system is operating in accordance with the water distribution schedule comprise:

program instructions to receive flow response feedback information measured by a plurality of sensors; and     program instructions to determine whether the flow response feedback information comports with expected flow behavior associated with the water distribution schedule.

14. The computer system of claim 11, wherein each zone of the plurality of zones comprises a grouping of a portion of the plurality of control nodes, one or more pressure sensors, one or more flow meters, and one or more drip lines for a particular target water distribution area.

15. The computer system of claim 11, wherein the program instructions to identify defective components in the system further comprise:

program instructions to receive flow response feedback information from the one or more pressure sensors and one or more flow meters of each zone;

program instructions to compare the flow response feedback information received from the one or more pressure sensors and one or more flow meters of each zone with expected flow behavior associated with the water distribution schedule; and     program instructions to identify as defective each zone for which received flow response feedback information does not comport with expected flow behavior associated with the water distribution schedule.

\* \* \* \* \*